United States Patent

Rachita et al.

(10) Patent No.: US 7,417,089 B2
(45) Date of Patent: Aug. 26, 2008

(54) LIQUID POLYMER

(75) Inventors: Michael Joseph Rachita, North Canton, OH (US); Vanessa Marika Guscoff, Wadsworth, OH (US); Lawson Gibson Wideman, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 4 days.

(21) Appl. No.: 11/546,716

(22) Filed: Oct. 12, 2006

(65) Prior Publication Data

US 2007/0032603 A1  Feb. 8, 2007

Related U.S. Application Data

(62) Division of application No. 10/876,941, filed on Jun. 25, 2004, now Pat. No. 7,271,218.

(51) Int. Cl.
*C08L 83/06* (2006.01)

(52) U.S. Cl. .................. 525/105; 525/106; 525/319; 525/342

(58) Field of Classification Search ................. 525/105, 525/106, 319, 342
See application file for complete search history.

(56) References Cited

U.S. PATENT DOCUMENTS

| | | | | |
|---|---|---|---|---|
| 3,159,601 A | 12/1964 | Ashby | ................. | 260/46.5 |
| 3,159,662 A | 12/1964 | Ashby | ................. | 260/448.2 |
| 3,220,972 A | 11/1965 | Lamoreaux | ................. | 260/46.5 |
| 4,022,959 A | 5/1977 | Sommer et al. | ................. | 526/180 |
| 4,696,986 A | 9/1987 | Halasa et al. | ................. | 526/181 |
| 5,919,870 A * | 7/1999 | Letchford et al. | ................. | 525/333.2 |
| 6,087,456 A | 7/2000 | Sakaguchi et al. | ................. | 525/342 |
| 6,183,551 B1 | 2/2001 | Okamoto et al. | ................. | 106/287.12 |
| 6,211,272 B1 * | 4/2001 | Shafer et al. | ................. | 524/270 |
| 6,320,010 B1 | 11/2001 | Sakaguchi et al. | ................. | 528/25 |

FOREIGN PATENT DOCUMENTS

EP   0709403 A1   5/1996

* cited by examiner

*Primary Examiner*—Robert D. Harlan
(74) *Attorney, Agent, or Firm*—Alvin T. Rockhill

(57) ABSTRACT

This invention discloses a process for manufacturing an elastomeric article by liquid injection molding, wherein the article has improved tensile strength and improved tear strength, said process comprising the steps of: (I) heating a curable composition comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an ether moiety, (2) a carbonyl inhibited platinum catalyst, and (3) a tetrakis(dialkyl siloxy) silane crosslinking agent, to a temperature which is within the range of 30° C. to 100° C.; (II) injecting the heated curable composition into a mold at a temperature which is within the range of 100° C. to 210° C. to produce the elastomeric article; and (III) removing the elastomeric article from the mold. This invention also discloses that the elasticity of such cured elastomeric articles can be increased without reducing cure levels by incorporating a liquid $C_5$ tackifier resin into the liquid polymer.

20 Claims, No Drawings

LIQUID POLYMER

This is a divisional and a continuation-in-part application of U.S. patent application Ser. No. 10/876,941, filed on Jun. 25, 2004 now U.S. Pat. No. 7,271,218.

BACKGROUND OF THE INVENTION

Elastomeric articles of manufacture are typically made by compressing a solid rubber, such as natural rubber or synthetic rubber, that contains a curative, such as sulfur, into a mold of the desired size and shape. Then, the rubber is cured (vulcanized) in the mold at an elevated temperature which thermosets the rubber permanently into the desired shape. This conventional process is relatively labor intensive in that it requires a mixing step wherein the curative and typically other rubber chemicals are blended into the rubber, a forming step wherein the rubber is compressed into the mold, a curing step wherein the rubber is cured in the mold, and a mold removal step wherein the cured rubber article is removed from the mold. This conventional process cannot be used in manufacturing intricate rubber articles where it is not possible to compress the solid rubber into a mold of the required intricate shape. An additional drawback associated with this conventional technique is that on occasion it is difficult to remove the cured rubber article from the mold and in some cases the article is damaged during its removal from the mold.

Silicone rubbers offer a significant advantage over natural rubber and conventional synthetic polydiene rubbers, such as synthetic polyisoprene rubber, polybutadiene rubber, styrene-butadiene rubber, and the like, in that they can be injection molded into shapes that can be very intricate in design. Injection molding also offers the advantage of being capable of being highly automated to significantly reduce labor requirements. Elastomeric articles made utilizing silicone rubbers can also be compounded to be visually clear which is beneficial in some applications. For instance, clear baby bottle nipples made by injection molding silicone rubber are preferred by many consumers. However, silicone rubbers are typically very expensive when compared to the cost of conventional polydiene rubber. High cost has accordingly precluded silicone rubbers from being used in many products and, of course, adds expense to other products where silicone rubbers are employed.

European Patent Application No. EP 0,709,403 A1 discloses a curable composition for injection molding which comprises, as essential ingredients, (A) a saturated hydrocarbon polymer containing at least one alkenyl group capable of undergoing a hydrosilylation reaction per molecule, (B) a hardener having a molecular weight of 30,000 or lower and containing at least two hydrosilyl groups per molecule, and (C) a hydrosilylation catalyst.

U.S. Pat. No. 6,087,456 discloses a curable composition comprising: (A) an isobutylene polymer which contains per molecule, at least one alkenyl group for reacting with a hydrosilyl group; (B) a curing agent which contains at least two hydrosilyl groups per molecule; (C) a hydrosilylation catalyst; and (D) a hydrocarbon compound having 6 to 20 carbon atoms which contains per molecule, at least one alkenyl or alkynyl group reaction for reacting with a hydrosilyl group.

U.S. Pat. No. 6,183,551 discloses a curable resin composition comprising: (A) saturated hydrocarbon polymer having at least one hydroxyl or hydrolyzable group bonded to a silicon atom and is crosslinkable through the formation of a siloxane bond, in a molecule and (B) a hydrogenated oligomer of a linear α-olefin.

U.S. Pat. No. 6,320,010 notes that the main component of such curable compositions is a polymer that can have a very high viscosity depending on the main component species. In particular when an isobutylene polymer is used as the main component, it is difficult to handle the isobutylene polymer as a liquid because of its high viscosity without applying some viscosity reducing technology, although the cured products obtained are excellent in various durability characteristics and, further, have low permeability and good vibration damping properties. Thus, for utilizing such curable compositions as potting agents or coating materials, it is essential to secure fluidity by some or other viscosity reducing technology. The most generally implemented technique for viscosity reduction is the addition of a nonreactive diluent as a plasticizer, for example, an oil. In that case, however, while the viscosity is reduced by the addition of the plasticizer, the mechanical strength is markedly lowered and evaporation of the plasticizer at elevated temperatures causes heating loss and volume reduction of cured products, leading to marked changes in mechanical characteristics and, further, induces blooming of the plasticizer. U.S. Pat. No. 6,320,010 further notes that reliability reduction accordingly results in cases where a plasticizer is used for viscosity reduction.

U.S. Pat. No. 6,320,010 more specifically discloses a curable composition which comprises (as essential components): (A) a saturated hydrocarbon polymer having more than one alkenyl groups capable of being hydrosilylated, on average, in each molecule and having a molecular weight of 2,000 to 50,000, (B) a component comprising a compound containing more than two silicon atom-bound hydrogen atoms, on average, in each molecule, (C) a compound having, within the molecule, one alkenyl group capable of being hydrosilylated, (D) a compound having, within the molecule, at least two alkenyl groups capable of being hydrosilylated and having a molecular weight less than 2,000, and (E) a hydrosilylation catalyst.

SUMMARY OF THE INVENTION

The present invention relates to a polymeric molding composition that is comprised of (1) a liquid polymer having repeat units that are derived from a conjugated diolefin monomer, wherein said liquid polymer has a weight average molecular weight which is within the range of 5,000 to 100,000, and wherein the liquid polymer is functionalized with an ether moiety, (2) a hydrosilylation catalyst, and (3) a crosslinking agent having at least 2 hydrosilyl groups per molecule. This polymeric composition has the advantage of being based upon a polydiene rubber which reduces raw material cost as compared to silicone rubbers. It can also be formulated for utilization in automated injection molding equipment to reduce labor costs. The polymeric molding compositions of this invention can also be manufactured into elastomeric articles having outstanding physical properties.

The present invention more specifically discloses a liquid polymer that is particularly useful in molding elastomeric articles, said liquid polymer being comprised of repeat units that are derived from a conjugated diolefin monomer, wherein said liquid polymer has a weight average molecular weight which is within the range of 5,000 to 100,000, and wherein the liquid polymer is functionalized with an ether moiety.

The subject invention further reveals a curable composition which is comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an ether moiety, (2) a hydrosilylation catalyst, and (3) a crosslinking agent having at least 2 hydrosilyl groups per molecule.

The present invention also reveals a curable composition for utilization in liquid injection molding, said composition being comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an ether moiety, (2) a carbonyl inhibited platinum catalyst, and (3) a tetrakis(dialkyl siloxy) silane crosslinking agent.

The present invention also reveals a process for manufacturing an elastomeric article by liquid injection molding, said process comprising the steps of: (I) heating a curable composition comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an ether moiety, (2) a carbonyl inhibited platinum catalyst, and (3) a tetrakis(dialkyl siloxy) silane crosslinking agent, to a temperature which is within the range of 30° C. to 100° C.; (II) injecting the heated curable composition into a mold at a temperature which is within the range of 100° C. to 210° C. to produce the elastomeric article; and (III) removing the elastomeric article from the mold.

The present invention also reveals a liquid polymer composition that is particularly useful in molding elastomeric articles, said liquid polymer composition being comprised of a liquid polymer and a liquid $C_5$ tackifier resin, wherein said liquid polymer is comprised of repeat units that are derived from a conjugated diolefin monomer, wherein said liquid polymer has a weight average molecular weight which is within the range of 5,000 to 100,000, and wherein the liquid polymer is functionalized with an ether moiety.

The subject invention also discloses a curable composition which is particularly useful for utilization in liquid injection molding, said composition being comprised of (1) a liquid polymer which is comprised of repeat units of a conjugated diolefin monomer, wherein the liquid polymer has a weight average molecular weight which is within the range of 5,000 to 100,000, and (2) a peroxide or hydroperoxide curative. The utilization of peroxide and hydroperoxide curatives has unexpectedly been found to improve the elasticity of the cured polymer.

DETAILED DESCRIPTION OF THE INVENTION

The liquid polymers of this invention are comprised of repeat units that are derived from at least one conjugated diolefin monomer. The conjugated diolefin monomers that can be utilized in the liquid polymers of this invention are of the general structural formula:

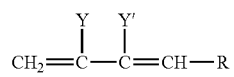

wherein R is selected from the group consisting of hydrogen atoms, alkyl groups (including cycloalkyl groups), alkaryl groups, or aryl groups containing from 1 to about 8 carbon atoms, and wherein Y and Y' can be the same or different and represent hydrogen atoms or alkyl groups containing from 1 to about 4 carbon atoms. Some representative examples of conjugated diolefin monomers that can be polymerized with the catalyst systems of this invention include 1,3-butadiene, isoprene, piperylene, 2-methyl-1,3-pentadiene, 2-ethyl-1,3-butadiene, 4-butyl-1,3-pentadiene, 2,3-dimethyl-1,3-pentadiene, 1,3-hexadiene, 1,3-octadiene, 1-phenyl-1,3-butadiene, and the like. Additional monomers that are copolymerizable with conjugated dieoefin monomers can also be incorporated into the liquid polymers of this invention. For instance, repeat units that are derived from vinyl aromatic monomers, such as styrene and α-methyl styrene can also be incorporated into the liquid polymers of this invention. It should be noted that a double bond is consumed in the polymerization of such monomers and that repeat units that are derived from a given monomer differ from the monomer in that the double bond is not present in the repeat unit.

The liquid polymers of this invention will typically contain at least 50 weight percent conjugated diolefin monomers. The liquid polymers of this invention will more typically contain at least 70 weight percent conjugated diolefin monomers and will generally contain at least 75 weight percent conjugated diolefin monomers. Vinyl aromatic monomers, such as styrene and α-methyl styrene, are the most common type of copolymerizable monomers that are employed in making the liquid polymers of this invention.

In cases where vinyl aromatic monomers are utilized they will typically be incorporated into such liquid polymers at a level of 1 weight percent to 30 weight percent. In many cases the vinyl aromatic monomer will be incorporated into the liquid polymer at a level of 20 weight percent to 25 weight percent. For instance, the liquid polymer can be comprised of repeat units that are derived from 70 weight percent to 99 weight percent of one or more conjugated diolefin monomers and 1 weight percent to 30 weight percent of a vinyl aromatic monomer. More typically, such liquid polymers will contain from 75 weight percent to 80 weight percent of one or more conjugated diolefin monomers and 20 weight percent to 25 weight percent vinyl aromatic monomers. For example, the liquid polymer can contain 40 weight percent isoprene repeat units, 40 weight percent 1,3-butadiene repeat units, and 20 weight percent styrene repeat units.

In many cases the liquid polymers of this invention will be comprised entirely of repeat units that are derived from one or more conjugated diolefin monomers. For instance, the liquid polymer can be a copolymer that is comprised entirely of repeat units of isoprene and 1,3-butadiene. In other cases, the liquid polymer will be a homopolymers of a single conjugated diolefin monomer. For example, the liquid polymer can be a polyisoprene homopolymer or a polybutadiene homopolymer.

The liquid polymers of this invention have a weight average molecular weight that is within the range of 5,000 to 100,000. A weight average molecular weight of at least 5,000 is required to attain needed physical properties. On the other hand, the weight average molecular weight of the polymer cannot be more than 100,000 or the polymer begins to become a solid and is not easily pumpable which is, of course needed in injection molding applications. The liquid polyisoprene rubbers of this invention will typically have a minimum weight average molecular weight of at least 20,000. In any case, it is preferred for the liquid polymers of this invention to have a weight average molecular weight that is within the range of 20,000 to 80,000. It is more preferred for the liquid polymers of this invention to have a weight average molecular weight that is within the range of 30,000 to about 50,000.

It is essential for the liquid polymers of this invention to be functionalized with an ether functionality to unexpectedly increase the tear strength and tensile strength of the cure polymer. Ether functionalization can be accomplished through a number of techniques which include, but are not limited to, functional initiation, functional termination, functional co-monomers (styrenics or diene based), post polymerization functionalization, or combinations thereof. One polymerization process that is ideally suited for the preparation of the ether-functionalized liquid PI polymer is anionic polymerization. However, it should be understood that numerous other polymerization techniques can be utilized.

It has been unexpectedly discovered that the cure rate of the liquid polymers of this invention can be greatly enhanced without sacrificing stability (scorch safety) at lower temperatures by increasing the level of vinyl microstructure in the polymer. In other words, the liquid polymer will cure faster at a temperature above 100° C. while remaining relatively stable at temperatures of less than 100° C. This unexpected benefit is attained at vinyl contents of greater than 5 percent and is further enhanced at vinyl contents of greater than 15 percent. It is normally preferred for the liquid polymer to have a vinyl microstructure content that is within the range of 10 percent to 20 percent with it being more preferred for the liquid polymer to have a vinyl microstructure content which is within the range of 15 percent to 20 percent.

The vinyl microstructure content of the liquid polymer can be increased by conducting the polymerization used in its synthesis in the presence of a polymerization modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, ditetrahydro-furylpropane, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like.

The polymerization modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, ditetrahydro-furylpropane, dimethyl ether and tetrahydrofuran are representative of highly preferred modifiers of this type. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. Nos. 4,022,959 and 4,696,986 are incorporated herein by reference in their entirety. The microstructure of the repeat units which are derived from conjugated diolefin monomers is a function of the polymerization temperature and the amount of polar modifier present. For example, it is known that higher temperatures result in lower vinyl contents. Accordingly, the polymerization temperature, quantity of modifier and specific modifier selected will be determined with the ultimate desired microstructure of the liquid polymer being synthesized being kept in mind.

The vinyl microstructure content of the liquid polymer can also be increased by copolymerizing a monomer containing at least 2 vinyl groups into the polymer. A preferred monomer containing 2 vinyl groups is 1-ethenyl-4-(3-butenyl)benzene since it copolymerized with conjugated diolefin monomers but does not form crosslinks that can lead to gel formation during polymerization. It is of the structural formula:

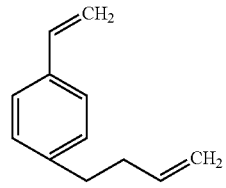

and is preferred because its vinyl group will polymerize during anionic polymerization but its 3-butenyl group will not. However, the 3-butenyl group is available for crosslinking in the presence of a hydrosilylation catalyst during the curing step.

Curable compositions that are suitable for use in molding applications can be made by blending the liquid polymers of this invention with a suitable curative system such as (a) a hydrosilylation catalyst and a crosslinking agent or (b) a peroxide or hydroperoxide curative. Peroxide curatives will typically be utilized at a level of 0.5 to 2 parts by weight per 100 parts by weight of the liquid polymer. Liquid and solid peroxides can both be used. Some representative examples of peroxides that can be used include benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like. Cumyl t-butyl peroxide and dicumyl peroxide are highly preferred peroxide curing agents.

In cases where the curative system includes a combination of a hydrosilylation catalyst and a crosslinking agent, the crosslinking agent will typically be used at a level which is within the range of 0.5 phr (parts by weight per 100 parts by weight of the liquid rubber) to 10 phr. The crosslinking agent will preferably be present in the curable composition at a level which is within the range of 1 phr to 7 phr. The hydrosilylation catalyst will typically be employed at a level which is within the range of 1 ppmr (parts of metal catalyst by weight per 1,000,000 parts by weight of the liquid rubber) to 100 ppmr. The hydrosilylation catalyst will preferably be present in the curable composition at a level which is within the range of 10 ppmr to 50 ppmr. In curable compositions that are used in injection molding applications the crosslinking agent will normally be present at a level which is within the range of 2 phr to 5 phr and the hydrosilylation catalyst will normally be present at a level which is within the range of 15 ppmr to 30 ppmr. However, it should be noted that the exact level of crosslinking agent and catalyst required will depend upon the characteristics of the liquid polymer and will normally be decreased with increasing levels of vinyl microstructure content in the liquid polymer.

The crosslinking agents that can be used in the practice of this invention have at least 2 hydrosilyl groups per molecule.

Crosslinking agents of this type are described in detail in U.S. Pat. No. 6,087,456. The teachings of U.S. Pat. No. 6,087,456 are incorporated herein by reference with respect to teaching the type of crosslinking agent (curing agent) that can be utilized in the practice of this invention. For instance, the crosslinking agent can be of the structural formula:

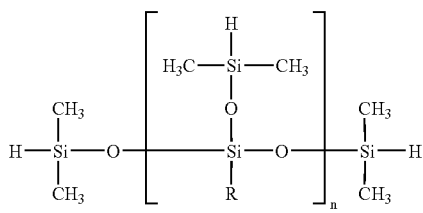

wherein n represents an integer from 1 to about 3, wherein R represents an alkyl group containing from 1 to 4 carbon atoms, a phenyl group, or a hydrosilyl group. The crosslinking agent will typically be a tetrakis(dialkyl siloxy) silane, a tris(dialkyl siloxy) alkyl silane, or a tris (dialkyl siloxy) aryl silane. The crosslinking agent will more typically be tetrakis (dimethyl siloxy) silane, tris(dimethyl siloxy) methyl silane, or tris (dimethyl siloxy) phenyl silane.

A wide variety of hydrosilylation catalysts can be used in making the curable compositions of this invention. Some representative examples of suitable hydrosilylation catalysts include chloroplatinic acid, elemental platinum, solid platinum supported on a carrier (such as alumina, silica or carbon black), platinum-vinylsiloxane complexes {for instance: $Pt(ViMe_2SiOSiMe_2Vi)_n$, and $Pt[(MeViSiO)_4]_m$}, platinum-phosphine complexes {for example: $Pt(PPh_3)_4$ and $Pt(PBu_3)_4$}, and platinum-phosphite complexes {for instance: $Pt[P(OPh)_3]_4$ and $Pt[P(OBu)_3]_4$}, wherein Me represents methyl, Bu represents butyl, Vi represents vinyl and Ph represents phenyl, and n and m represent integers. The platinum-hydrocarbon complex described in the specification of U.S. Pat. Nos. 3,159,601 and 3,159,662, and the platinum-alcoholate catalyst described in the specification of U.S. Pat. No. 3,220,972 can also be used. The teaching of U.S. Pat. Nos. 3,159,601, 3,159,662, and 3,220,972 are incorporated herein by reference.

Hydrosilylation catalysts containing metals other than platinum can also be used in the practice of this invention if the moldable composition is being used in an application other than injection molding. Some representative examples of such catalysts include: $RhCl(PPh_3)_3$, $RhCl_3$, $Rh/Al_2O_3$, $RuCl_3$, $IrCl_3$, $FeCl_3$, $AlCl_3$, $PdCl_2\text{-}2H_2O$, $NiCl_2$, $TiCl_4$, and the like. These catalysts can be used alone or in combination. In view of catalytic activity, chloroplatinic acid, platinum-olefin complex, platinum-vinylsiloxane complex, and $Pt(acac)_2$, are preferable.

Inorganic fillers can also be added to the moldable compositions of this invention to enhance physical properties. Some representative examples of inorganic fillers that can be used include calcium carbonate, talc, silica, carbon black and other ordinary inorganic fillers. Silica fillers will typically be added at a level which is within the range of 5 phr to 40 phr and will preferably be added at a level of 15 phr to 30 phr. Since the curable composition of the present invention is formed by crosslinking by a hydrosilylation reaction, however, influences on the hydrosilylation reaction should be taken into consideration in using such a filler. For instance, if the filler has a high content of absorbed moisture, the moisture will react with the curing agent, which can result in foaming during the curing step. When the filler contains a component capable of interfering with the hydrosilylation reaction, for example a nitrogen and/or sulfur atom, a reduction in curability or insufficient curing may result. Some fillers can have an influence on the storage stability of the curable composition. In using such an inorganic filler, it is important to confirm the influence of the inorganic filler on the curability and/or storage stability beforehand. If visual clarity is being sought it is also, of course, important to avoid fillers that will significantly reduce the clarity of the composition, such as carbon black.

One or more of antioxidants, ultraviolet absorbers, pigments, surfactants and other additives can also be incorporated in the molding compositions of this invention in appropriate amounts. Again, the influence of these agents on the hydrosilylation reaction should also be taken into consideration.

It has been found that the elasticity of cured rubber products made with the liquid polymers of this invention can be greatly improved by curing the polymer with a peroxide or hydroperoxide curative and that elasticity can be further increased by incorporating a liquid $C_5$ tackifier resin therein. The liquid $C_5$ tackifier resin can be blended into the liquid polymer utilizing any standard mixing device. By utilizing a $C_5$ tackifier resin, the elasticity of the cured rubber product made can be increased without lowering the level of curative which can result in the rubber product having the undesirable attribute of being too sticky for some applications. The $C_5$ liquid tackifier resins will typically have a weight average molecular weight which is within the range of about 600 to 1000 and are comprised of monomers containing 5 carbon atoms including but not limited to 2-methyl-2-butene, cis-piperylene, trans-piperylene, cyclopentene, and additional unsaturated hydrocarbon monomers containing from about 4 to about 18 carbon atoms. A liquid C5 tackifier resin that is useful in the practice of this invention is commercially available from The Goodyear Tire & Rubber Company as Wingtack® 10 tackifier resin. It has a number average molecular weight of 660, a weight average molecular weight of 800, a glass transition temperature of −36° C., and a softening point of 10° C.

The amount of liquid $C_5$ tackifier resin added will depend upon the increase in elasticity that is being sought. Normally, a maximum elongation at break is attained by incorporating about 50 phr (parts per hundred parts by weight of rubber) of the liquid tackifier resins into the liquid polymer. Accordingly, in most cases, from about 1 to about 100 phr of the liquid tackifier resin will be incorporated into the liquid polymer. More typically, from about 10 phr to about 50 phr of the liquid tackifier resin will be mixed into the liquid polymer.

Moldable compositions that are used in injection molding applications will employ a carbonyl inhibited platinum catalyst and a tetrakis(dialkyl siloxy) silane crosslinking agent. In injection molding applications the molding composition will be heated to an elevated temperature which is within the range of 30° C. to 100° C. to facilitate the pumping of the moldable composition and injecting it into a mold. The molding composition will preferably be heated to a temperature within the range of 40° C. to 80° C. for pumping and injection into the mold. The mold used will, of course, be of the desired shape for the elastomeric article being manufactured. The mold will be maintained at a temperature which is within the range of 100° C. to 210° C. to cure the polymeric composition. The mold will preferably be maintained at a temperature of 120° C. to 180° C. until the molding composition is cured. After the polymeric composition has been cured or at least substantially cured, the elastomeric article made will be removed from the mold.

EXAMPLES

The following series of examples is intended to be illustrative of the polymer synthesis, compounding, and mixing procedure used with liquid polymers and is not intended to limit the scope of the invention, nor are they intended to limit the method of polymer synthesis, compounding, or mixing of the materials. One skilled in the art of polymer synthesis, compounding, and mixing realizes that a number of methods may be used to obtain the same results and give the desired compound paste without parting from the spirit or intent of the present invention.

Polymer Synthesis:

Low molecular weight polyisoprene was synthesized in a one-gallon batch reactor equipped with a variable speed agitator and a heating/cooling jacket to control reactor temperature via a distributed Foxboro control system. Reaction conditions included moderate stirring under an inert atmosphere (nitrogen at 40 psi) at 65° C. Prior to premix loading, the reactor was filled with dry hexane and quenched with n-BuLi to minimize the scavenger level. Approximately 2,000 grams of 15 weight percent isoprene premix was charged into the reactor. The appropriate amount, and type, of initiator is charged into the reactor via a syringe to achieve the desired functionality and molecular weight. After 2 hours at 65° C. the reaction was shortstopped with 1.0 molar equivalent isopropanol (or functional terminator if desired) and 0.50 phr BHT antioxidant. Polymer is recovered after devolatilization in a forced air oven and checked for molecular weight (Table 1).

Polymer Characterization:

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 weight percent solution of polymer in THF through a 1.0 micron filter prior to injection. Polystyrene standards were used to calibrate the instrument.

TABLE 1

Series of liquid polyisoprenes containing different functional groups.

| Functional Group | Mn (g/mol) | Mw (g/mol) | MWD | Volatiles (%) | Yield (g) |
|---|---|---|---|---|---|
| H | 50,940 | 55,210 | 1.08 | 0.4 | 340.5 |
| OH | 46,810 | 51,900 | 1.11 | 0.39 | 360.7 |
| SiOEt | 52,160 | 56,330 | 1.08 | 0.3 | 362 |
| DimethylAmine | 51,310 | 53,470 | 1.04 | 0.31 | 350 |
| Pyrrolidino | 45,230 | 46,120 | 1.02 | 0.39 | 349 |
| tButoxy | 52,200 | 53,260 | 1.02 | 0.3 | 366 |
| tBuMe2SiO— | 51,120 | 52,690 | 1.03 | 0.2 | 342.6 |

Example 1

A+B Two Component Hydrosilylation Cure of t-Butoxy-Terminated 53,000 MW liquid PI A t-Butoxy-Terminated 53,000 MW liquid polymer (37.0 grams) was weighed directly into a polyethylene pre-blend 1-liter vessel, followed by the addition of 4.0 phr (1.48 grams) of liquid Tetrakis(dimethylsiloxy)silane. The liquid polymer and liquid silane tetrahydride were mixed for 10 minutes at room temperature to give a homogeneous rubber-silane hydride compound. A silica filler, 10 phr (3.7 grams) of Degussa Aerosil 200 (200 m² grams) fumed silica, was then added to the pre-blend vessel containing the rubber-silane compound and mixed for 10 minutes at room temperature with low agitation to give a white compound rubber powder. A liquid platinum zero complex was then added to the white powder compound, 750 ppm (0.03 grams) of a platinum carbonyl complex with a 3-3.5% platinum concentration in vinyl terminated polydimethyl siloxane, and mixing was continued for an additional 10 minutes. An additional 20 phr (7.4 grams) of the Aerosil silica filler was added and mixed for an additional 10 minutes, and then poured into a 0.3-liter stainless steel Waring mixer. The white powdered rubber compound was mixed in the Waring mixer at room temperature until a translucent/white paste resulted, usually about 10 minutes. A 5.0 grams portion of the compound paste was run on the Alpha 2000 RPA, isothermally at 180° C. for 30 minutes, to obtain the cure profile of the rubber and the time for 90% of the cure to result. A 30.0 grams portion of the paste was then cured between Mylar sheets in a cure press at 9 tons of pressure at 180° C. for T90+1 minutes to give a cured rubber sheet from which Die"C" tear strength and tensile dumbbells were prepared.

The preparation and use of ether-functionalized liquid polyisoprene to increase processability and lower energy requirements in compound mixing has unexpectedly given improved tear strength and tensile properties in silica-filled compounds both in Pt/hydrosilylation cure as well as in peroxide based cures. These results have been compared against other functional groups as well as to a non-functionalized control (see Table 2 and Table 3). As Table 2 shows, use of tert-butoxy functionalized material imparts a dramatic improvement in the tear and tensile of Pt/hydrosilylation cured parts. Table 3 also shows this to be the case for peroxide based compounds. Moreover, a comparison of Table 2 and Table 3 shows the dramatic improvement in elongation at break that can be attained with a peroxide or hydroperoxide curative without regard to polymer functionalization. The ether-functionalization can be introduced through a number of techniques which include, but is not limited to, functional initiation, functional termination, functional co-monomers (styrenics or diene based), post polymerization functionalization, or combinations thereof.

Example 2

Peroxide Cure of t-Butoxy-Terminated Liquid Polyisoprene having a Molecular Weight of 53,000

A t-butoxy-terminated 53,000 MW liquid polymer having a molecular weight of 53,000 (37.0 grams) was weighed directly into a polyethylene pre-blend 1-liter vessel, followed by the addition of 1.75 phr (0.65 grams) of liquid cumyl t-butyl peroxide. The liquid polymer and liquid peroxide were mixed for 10 minutes at room temperature to give a homogeneous rubber-peroxide compound. A silica filler, 30 phr (11.1 grams) of Degussa Aerosil 200 (200 m2 grams) fumed silica, was then added to the pre-blend vessel containing the rubber-peroxide compound and mixed for 10 minutes at room temperature with low agitation to give a white compound rubber powder, which was poured into a 0.3-liter stainless steel Waring mixer. The white powdered rubber compound was mixed in the Waring mixer at room temperature until a translucent/white paste resulted, usually about 10 minutes. A 5.0 gram portion of the compound paste was run on the Alpha 2000 RPA, isothermally at 160° C. for 30 minutes, to obtain the cure profile of the rubber and the time for 90% of the cure to result. A 30.0 gram portion of the paste was then cured between Mylar sheets in a cure press at 9 tons of pressure at 160° C. for 30 minutes to give a near colorless cured rubber sheet from which Die"C" tear strength and tensile dumbbells were prepared.

TABLE 2

Comparison of physical properties in Pt/Hydrosilylation cure of functionalized liquid PI

| Functional Group | tensile (psi) | tear (ppi) | EB (%) |
|---|---|---|---|
| H | 1,054 | 88 | 139 |
| OH | 957 | 89 | 160 |
| SiOEt | 980 | 79 | 181 |
| DMAP | 691 | 87 | 198 |
| Pyrrolidine | 212 | 41 | 116 |
| tButoxy | 1,102 | 114 | 207 |
| TBDMS | 951 | 79 | 161 |

TABLE 3

Comparison of physical properties for 1.75 phr peroxide cured functionalized liquid PI

| Functional Group | tensile (psi) | tear (ppi) | EB (%) | 500% Modulus |
|---|---|---|---|---|
| H | 1,322 | 128 | 625 | 780 |
| OH | 1,392 | 133 | 568 | 1022 |
| SiOEt | 1,051 | 95 | 496 | 666 |
| DMAP | 1,306 | 117 | 546 | 1046 |
| Pyrrolidine | 1,540 | 127 | 622 | 856 |
| tButoxy | 1,532 | 145 | 570 | 1097 |
| TBDMS | 1,458 | 114 | 622 | 843 |

Example 3

This example serves to further demonstrate the unexpected finding that ether-functionalized liquid polyisoprene rubber provides improved tear and tensile strength. As shown in Table 4 compounding a t-butoxy-functionalized polyisoprene according to Example 2 at various levels of peroxide cure agent indicates optimized conditions at 1.75 phr peroxide. Comparing this to an unfunctionalized control liquid polyisoprene clear demonstrates the advantage of the ether-functionalized material even at high peroxide levels (2.00 phr). Improved tear and tensile strength can also be realized by blending the ether-functionalized liquid polyisoprene with the un-functionalized control polymer.

TABLE 4

Optimized peroxide levels

| Peroxide (phr) | Tear (ppi) | Tensile (psi) | EB (%) |
|---|---|---|---|
| t-Butoxy-PI | | | |
| 1.50 | 121 | 1502 | 757 |
| 1.75 | 145 | 1532 | 570 |
| 1.85 | 139 | 1094 | 434 |
| 2.00 | 132 | 731 | 319 |
| 2.25 | 96 | 954 | 415 |
| 2.50 | 99 | 739 | 256 |
| Control-PI | | | |
| 1.75 | 128 | 1322 | 625 |
| 2.00 | 104 | 1174 | 483 |
| 50/50 blend of t-Butoxy-PI/Control-PI | | | |
| 1.75 | 139 | 1447 | 528 |

Examples 4-9

Wingtack® 10 liquid tackifier resin from Goodyear Chemical (a division of The Goodyear Tire & Rubber Company) was added to compounded and 30 phr silica-filled low molecular weight (50,000) liquid polyisoprene rubber to help processing and to lower the energy requirements during mixing. Unexpectedly, it was found that the modulus of the cured rubber was reduced and the elasticity or elongation at break of the peroxide-cured rubber improved appreciably over the 50,000 molecular weight control liquid polyisoprene without the Wingtack® 10 resin. When the modulus is reduced by simply lowering the amount of curative in the liquid polyisoprene, a sticky rubber results. The following examples reported in Table 5 are intended to be illustrative of this unexpected finding.

TABLE 5

Comparison of physical properties of liquid polyisoprene (unmodified) cured with 1.75 phr of peroxide at different levels of $C_5$ tackifier resin.

| Example: | 50K PI + phr WT-10 | Elongation-@-Break(%) | Modulus (300%) | Tensile Strength (psi) | Tear Strength (ppi) |
|---|---|---|---|---|---|
| 4 | 50K Control + 0 phr | 483 | 497 | 1174 | 94 |
| 5 | 50K Control + 100 phr | 592 | 175 | 467 | 62 |
| 6 | 50K Control + 50 phr | 700 | 236 | 1008 | 70 |
| 7 | 50K Control + 33 phr | 589 | 316 | 1009 | 78 |
| 8 | 50K Control + 18 phr | 577 | 317 | 999 | 78 |
| 9 | 50K Control + 10 phr | 443 | 394 | 726 | 80 |

While certain representative embodiments and details have been shown for the purpose of illustrating the subject invention, it will be apparent to those skilled in this art that various changes and modifications can be made therein without departing from the scope of the subject invention.

What is claimed is:

1. A liquid polymer that is particularly useful in molding elastomeric articles, said liquid polymer being comprised of repeat units that are derived from a conjugated diolefin monomer and 1-ethenyl-4-(3-butenyl) benzene, wherein said liquid polymer has a weight average molecular weight which is within the range of 5,000 to 100,000, wherein at least 50 weight percent of the repeat units in the liquid polymer are comprised of the conjugated diolefin monomer, and wherein the liquid polymer is functionalized with an ether moiety.

2. A liquid polymer as specified in claim 1 wherein said liquid polymer has a vinyl microstructure content of at least 5 percent.

3. A liquid polymer as specified in claim 2 wherein the liquid polymer has a weight average molecular weight which is within the range of 20,000 to 80,000.

4. A liquid polymer as specified in claim 2 wherein said liquid polymer has a vinyl microstructure content of at least 15 percent.

5. A liquid polymer as specified in claim 3 wherein said liquid polymer has a vinyl microstructure content which is within the range of 10 percent to 20 percent.

6. A liquid polymer as specified in claim 4 wherein the liquid polymer has a weight average molecular weight which is within the range of 30,000 to 50,000.

7. A liquid polymer as specified in claim 3 wherein said liquid polymer has a vinyl microstructure content which is within the range of 15 percent to 20 percent.

8. A liquid polymer as specified in claim 3 wherein at least 70 weight percent of the repeat units in the liquid polymer are comprised of the conjugated diolefin monomer.

9. A liquid polymer as specified in claim 3 wherein the conjugated diolefin monomer is 1,3-butadiene.

10. A liquid polymer as specified in claim 3 wherein the conjugated diolefin monomer is isoprene.

11. A liquid polymer as specified in claim 9 wherein the repeat units in the liquid polymer are derived from a combination of isoprene and 1,3-butadiene.

12. A liquid polymer as specified in claim 3 wherein at least 75 weight percent of the repeat units in the liquid polymer are comprised of the conjugated diolefin monomer.

13. A liquid polymer as specified in claim 3 wherein the liquid polymer is a polybutadiene homopolymer.

14. A liquid polymer as specified in claim 1 wherein the liquid polymer is a polyisoprene homopolymer.

15. A liquid polymer as specified in claim 14 wherein the liquid polyisoprene homopolymer has a weight average molecular weight which is within the range of 20,000 to 80,000.

16. A liquid polymer composition that is particularly useful in molding elastomeric articles, said liquid polymer composition being comprised of a liquid polymer and a liquid $C_5$ tackifier resin, wherein the liquid $C_5$ tackifier resin is comprised of repeat units that are derived from (a) 2-methyl-2-butene, (b) cis-piperylene, (c) trans-piperylene, (d) cyclopentene and (e) additional unsaturated hydrocarbon monomers containing from about 4 to about 18 carbon atoms, wherein said liquid polymer is comprised of repeat units that are derived from a conjugated diolefin monomer, wherein said liquid polymer has a weight average molecular weight which is within the range of 5,000 to 100,000, wherein at least 50 weight percent of the repeat units in the liquid polymer are comprised of the conjugated diolefin monomer, and wherein the liquid polymer is further comprised of repeat units that are derived from 1ethenyl-4-(3-butenyl) benzene.

17. A liquid polymer composition as specified in claim 16 wherein the liquid $C_5$ tackifier resin is present at a level within the range of 1 phr to 100 phr.

18. A liquid polymer composition as specified in claim 16 wherein the liquid $C_5$ tackifier resin is present at a level within the range of 10 phr to 50 phr.

19. A liquid polymer composition as specified in claim 17 wherein the liquid $C_5$ tackifier resin has a weight average molecular weight which is within the range of about 600 to about 1000.

20. A liquid polymer composition as specified in claim 16 wherein the liquid polymer is a polyisoprene homopolymers having a weight average molecular weight which is within the range of 20,000 to 80,000.

* * * * *